United States Patent [19]

Grönert et al.

[11] Patent Number: 4,893,514

[45] Date of Patent: Jan. 16, 1990

[54] DEVICE FOR MEASURING FORCES IN METAL SPINNING LATHES

[75] Inventors: Heinz Grönert, Emmering; Jochen Vetter, Karlsfeld; Manfred Eckert, Dachau; Henning von Petersdorff, Puchheim; Johann Münich, Munich, all of Fed. Rep. of Germany

[73] Assignee: MAN Technologie GmbH, Munich, Fed. Rep. of Germany

[21] Appl. No.: 220,003

[22] Filed: Jul. 15, 1988

[30] Foreign Application Priority Data

Aug. 25, 1987 [DE] Fed. Rep. of Germany ....... 3728313

[51] Int. Cl.$^4$ ................................................. G01L 5/00
[52] U.S. Cl. ................................................. 73/862.55
[58] Field of Search ................. 73/774, 775, 779, 780, 73/781, 782, 862.06, 862.62, 862.64, 862.65, 862.66, 862.67, 865.9, 104, 862.55; 82/2 B

[56] References Cited

U.S. PATENT DOCUMENTS 3,648,514 3/1952 Vilain ............................... 73/862.64
4,721,001 1/1988 Hesse et al. ...................... 73/862.57

FOREIGN PATENT DOCUMENTS 3434131  3/1986  Fed. Rep. of Germany ... 73/862.82
3515126 10/1986  Fed. Rep. of Germany ... 73/862.57
0141717  2/1961  U.S.S.R. ............................ 73/862.54
0897471  1/1982  U.S.S.R. ................................ 82/2 B
0750445  6/1956  United Kingdom ............. 73/862.64

Primary Examiner—Robert R. Raevis
Attorney, Agent, or Firm—Roberts, Spiecens & Cohen

[57] ABSTRACT

For the continuous measurement of the thrust forces produced by the spinning rolls on the workpiece to be extended while the spinning rolls are rotating a measuring rod is provided, which has its one end fixed coaxially on the spindle within a hollow spindle, while its other end projects freely out of the spindle. In the plane of the free end of the measuring rod a distance sensor is arranged, which detects the radial displacement, caused by the radial flexure motion of the spindle, of the measuring rod and computes the force acting on the spinning roll using a processing unit.

5 Claims, 3 Drawing Sheets

DEVICE FOR MEASURING FORCES IN METAL SPINNING LATHES

BACKGROUND OF THE INVENTION.

The invention relates to a device for measuring the radial forming forces in metal spinning latches, whose spin rolls are attached to spindles, which are supported in bearings in a stationary bearing housing.

Metal spinning is a method for the cold shaping of hollow cylindrical components, in which spinning rolls are used so as to make punctuate force engagement along helical lines so that part of the thickness of the tube wall is stretched in the length direction of the tube. As it is radially displaced by the thrust force the material flows with a shear motion away in an axial direction. Spinning lathes are generally equipped with two or three symmetrically arranged spinning rolls which generally maintain a balance between the relatively high radial forces.

If the tool geometry is correctly selected and the process data are well matched tubular workpieces may be spun with an extraordinary degree of precision, and for instance within a single cross section it is possible to keep deviations in the wall thickness under 0.01 mm.

The relatively complex forming phenomena taking place during metal spinning are however hardly to be understood. If the forming parameters are correct, the workpiece is in order. If they depart from the intended value at any position, the effects will only be able to be seen in the finished workpiece. A certain indication of what is taking place during forming at a given time may be seen from the forces occurring at the individual spinning rolls. If they are measured, the metal spinning operation may be directly and continuously monitored and corrected if necessary or automatically controlled. In this respect it is sufficient if only one of the three force components is measured. It would be obvious to measure the radial forces. For the sake of getting a better overall picture and for matching it is however necessary for each spin roll to be provided with its own measuring means.

Conventionally such forces are measured with the aid of wire strain gages (DMS). The elastic deformation caused by the forces on the object are transferred to the DMS attached in an isolated manner to the object and change the electrical resistance thereof. The drop in voltage resulting from this serves as a measurement of the forces.

In accordance with another familiar method, forces are measured using piezoelectric sensors. In this case the effect of certain crystals is used in order, under the action of thrusts or strains in certain directions, to build up electrical charges at the ends of their polar axes.

These two methods of measurement are not particularly well suited to the measurement of radial forces during metal spinning. On the one hand difficulties occur if such methods are applied to rotating machine parts such as the spinning rolls or their spindles or as regards the transmission of signals from rotating to stationary parts. On the other hand under rough production conditions it is hardly possible to ensure reliable operation of either system. In the case of force measurement with piezoelectric sensors the very high forces during metal spinning would be a problem yet to be resolved.

SUMMARY OF THE INVENTION

The invention has as one of its objects the development of a measuring device for metal spinning lathes of the initially specified type with which the thrusts of the spinning rolls may be ascertained in a very accurate and reliable manner and which may be used with rotating structural components.

In order to atatin this or other objects the invention provides a device for measuring radial forming forces in a spinning lathe whose spinning rolls are mounted on spindles which are supported in bearings in a stationary bearing housing, comprising at least one detector rod mounted in a coaxial bore in at least one of the spindles, said rod being connected with the spindle at a point where its angle of flexure is greatest, and at least one sensor arranged opposite a free end of said rod remote from said point of connection with said spindle, said sensor being mounted on said bearing housing.

In this case the flexure of the spinning roll spindle is measured. In this respect the basic principle is the use of a measuring rod, which is precisely connected with the spinning roll spindle, drilled to be hollow, by means of a flange or other guide surface and which rotates with the latter in a coaxial position. The connection of the measuring rod with the spindle is at the point were the flexure angle is maximum, when the spinning forces take effect or at the point which produces the greatest deflection at the end of the measuring rod. In the plane of the measuring rod end, sensors are arranged in the housing of the spinning roll spindle, which continuously respond to the distance from the measuring rod without making contact. Owing to the great length of the measuring rod, from the position of attachment to the plane in which measuring takes place, the relatively small flexure of the spindle is magnified to provide displacements which are able to be exactly measured and which are then able to be reproducibly detected by a sensors. Owing to the decrease in cross section of the measuring rod, the, respective mass or moments of inertia of the measuring rod, around the plane of attachment to the plane of the measuring sensors is reduced and, rotation substantially free of oscillation of the measuring rod is ensured. In addition passive or active damping mechanisms may be provided.

The advantages of the described measuring system may be summarized as follows:

The forces are picked up relatively near the position at which they occur.

The elastic flexure of the spinning roll spindle is substantially free of interfering frictional effects.

The small deformation displacements of the spindle flexure are within the safe range of resistance to fatigue. No changes whatsoever are to be expected even over periods of years.

The transmission of the spindle flexure to the measuring rod is responsible for an error-free magnification of the deformation displacement by a factor of 5 to 10 even in the rotating part of the chain along which the displacement is transmitted.

The transmission of the deformation displacement to a static part of the machine, the reference or base point, takes place by a displacement sensor operating without physical contact.

The entire chain of parts along which the displacement is transmitted is encapsulated and is fully protected against damage.

The null setting of the measuring system is ensured by using two installed sensors (displacement pickups).

The measuring system operates in a manner completely free of wear, does not require bonded joints and detects the complete force occurring.

The measuring system is able to be manufactured at an economic price

As the distance sensors it is possible to use optical, electromagnetic and other known sensors. Furthermore the processing of the signals takes place using known methods, the transmission of the measured displacements to the flexure displacement path being determined by the geometry of the connection between the measuring rod and the spindle. Using the measured signals and the processed signals resulting therefrom it is possible to drive an automatic controller—not itself forming part of the invention—which influences the thrusts on the spinning rolls.

In the drawing working examples of the invention are shown diagrammatically.

DETAILED DESCRIPTION OF PREFERRED EMBODIMENTS OF THE INVENTION.

Figure 1:
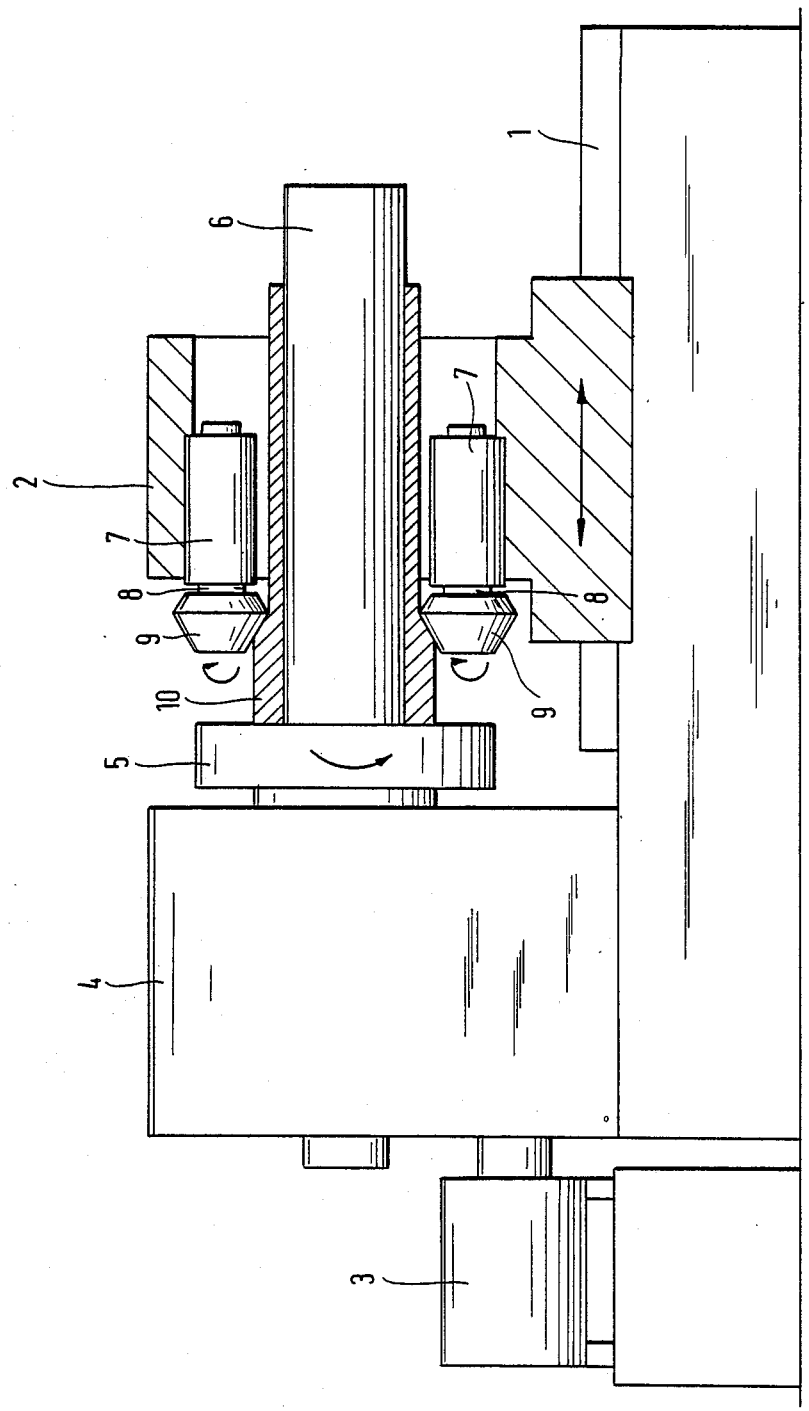
FIG. 1 shows, partly in section, the basic construction of a metal spinning lathe.

Referring now more especially to FIG. 1 it will be seen that on a bed 1 it is possible for a spinning roll support 2 to be moved axially. The face plate 5, the spinning mandrel 6 and the workpiece 10 are rotated via a motor 3 and the spindle box 4. The gap between the spinning mandrel 6 and the spinning rolls 9 determines the thickness of the wall of the tube to which the initial wall thickness of the workpiece 10 is stretched during simultaneous rotation and feed motion. The spinning rolls 9 are firmly held on the spindles 8, which are rotatably supported in the bearing housing 7. The rotation of the spinning rolls is generally caused by friction during forming.

Figure 2:
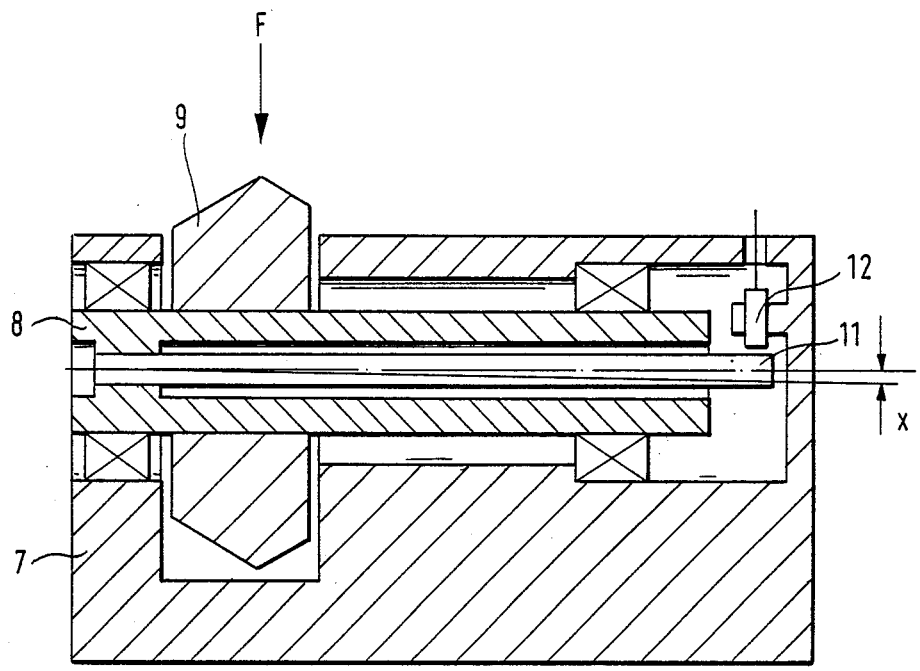
FIGS. 2 through 4 each show, in section, one working example of the invention.

FIG. 2 shows a spindle 8 which is supported in bearings at both ends in the bearing housing 7. The spindle is drilled out so as to be hollow. A measuring rod 11 is connected at one end by a flange or other guide surfaces with the spindle in a firm and accurate manner. The other end of the measuring rod extends out of the spindle and provides a measuring plane coinciding with the plane of a sensor 12 attached in the bearing housing 7, such sensor 12 laterally facing the free end of the rod 11 for measuring the distance to the surface of the measuring rod without making physical contact therewith.

A force F acting radially on the spinning roll produces a certain flexure of the spindle. Accordingly the measuring rod 11 is angularly displaced in relation to the bearing axis and such displacement is magnified at the sensor end of the measuring rod in accordance with the laws of leverage. Since the direction of the force F does not change and the position of the sensor 12 in relation thereto does not shift either, the direction of the spindle flexure also remains unaltered if the observer does not change his position. The spindle itself is continuously subject to changes in the rotational flexure. The amount of displacement and the direction thereof are denoted by the letter x.

Figure 3:
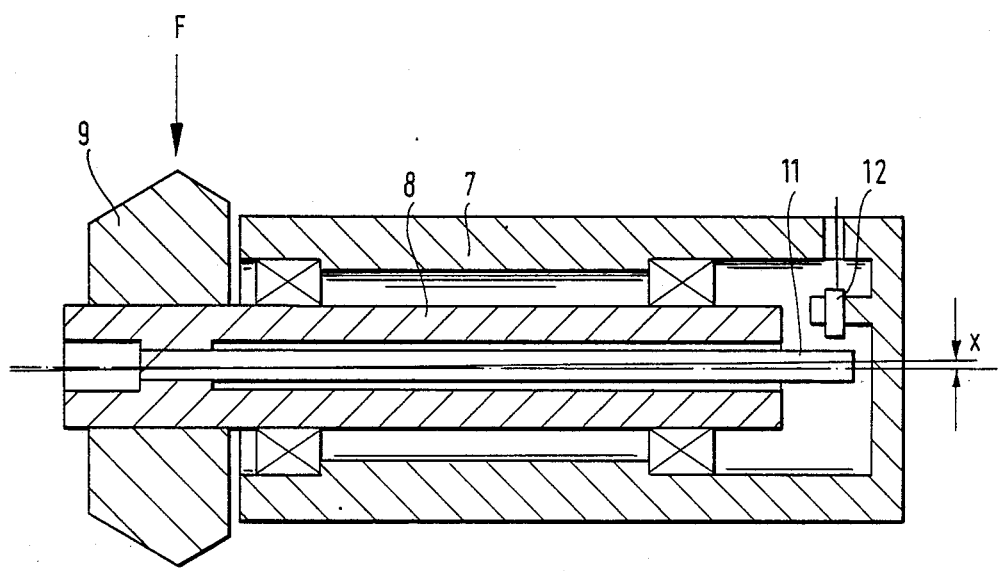

In FIG. 3 the spindle 8 extends at one of its ends out of the bearing housing. The spinning roll is attached to this projecting spindle end. The method of measurement operates in the same manner as previously described. The direction of the displacement at the sensor end of the measuring rod is offset by 180°.

Figure 4:
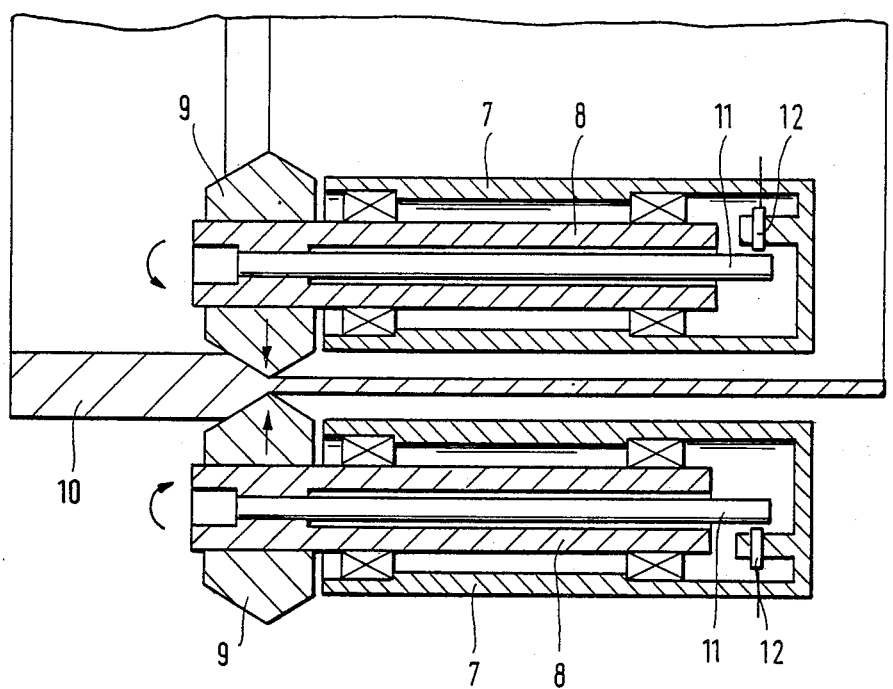

FIG. 4 shows the measuring system for an opposed roll spinning lathe, the reference numerals being the same as those used for like parts in FIGS. 1 through 3.

We claim:

1. A spinning lathe comprising
   a support,
   a plurality of spinning means on said support for applying radial forming forces to a workpiece, each spinning means comprising:
   a housing secured to said support
   a spindle rotatably supported in said housing, said spindle having opposite ends,
   a spinning roll secured to said spindle proximate one of the ends thereof,
   said spindle having a coaxial bore therein with an open end,
   a detector rod in said bore, said detector rod being secured to the spindle in a region at which the spinning roll is secured to the spindle,
   said detector rod having an end projecting out of said open end of said bore and beyond said spindle, said end of said rod being free and unsupported and undergoing displacement in response to application of force to said spindle by said roll, and
   sensor means fixed to said housing adjacent to the projecting end of said rod for measuring displacement of said end of the rod without physical contact therewith, said sensor means laterally facing said projecting end of said rod to measure said displacement by measuring the distance between said end of said rod and the sensor means.

2. A spinning lathe as claimed in claim 1 comprising a pair of spaced bearings supporting said spindle for rotation, said spinning roll being fixed to said spindle for rotation therewith.

3. A spinning lathe as claimed in claim 2 wherein the spinning roll on said spindle is located between said pair of spaced bearings.

4. A spinning lathe as claimed in claim 2 wherein the spinning roll on said spindle is located outside said pair of spaced bearings.

5. A spinning lathe as claimed in claim 1 wherein each spinning means further comprises a second spindle and respective spinning roll in adjacent facing relation with the first said spindle and spinning roll such that the first and second spinning rolls engage opposite surfaces of a workpiece interposed therebetween.

* * * * *